United States Patent
Johannes et al.

(10) Patent No.: US 9,122,412 B1
(45) Date of Patent: Sep. 1, 2015

(54) SYSTEM AND METHOD FOR PRODUCING TREE PERSPECTIVES OF STORAGE SYSTEMS

(71) Applicant: NetApp, Inc., Sunnyvale, CA (US)

(72) Inventors: Erik Johannes, Beaverton, OR (US); Brian David Mason, Beaverton, OR (US); Troy Lee Hadeen, Boulder, CO (US)

(73) Assignee: NetApp, Inc., Sunnyvale, CA (US)

( * ) Notice: Subject to any disclaimer, the term of this patent is extended or adjusted under 35 U.S.C. 154(b) by 212 days.

(21) Appl. No.: 13/777,009

(22) Filed: Feb. 26, 2013

(51) Int. Cl.
*G06F 17/30* (2006.01)
*G06F 3/06* (2006.01)

(52) U.S. Cl.
CPC .................................. *G06F 3/0653* (2013.01)

(58) Field of Classification Search
CPC ........................................................ G06F 3/0653
USPC ........................................................... 707/758
See application file for complete search history.

(56) References Cited

U.S. PATENT DOCUMENTS

| | | | | |
|---|---|---|---|---|
| 8,559,867 | B2 * | 10/2013 | Li et al. | 455/7 |
| 2009/0119255 | A1 * | 5/2009 | Frank et al. | 707/3 |
| 2010/0023491 | A1 * | 1/2010 | Huang et al. | 707/3 |

OTHER PUBLICATIONS

Ming-Hsiang Tsou, "An Operational Metadata Framework for Searching, Indexing, and Retrieving Distributed Geographic Information Services on the Internet", 2002, pp. 313-332.*
Alexander Ames et al., "Richer File System Metadata Using Links and Attributes", Apr. 2005, pp. 101-112.*
Lueng et al., "Spyglass: Fast, Scalable Metadata Search for Large-Scale Storage Systems", May 2008, pp. 1-15.*
Lueng et al., "Magellan: A Searchable Metadata Architecture for Large-Scale File Systems", Nov. 2009, pp. 1-13.*

* cited by examiner

*Primary Examiner* — Apu Mofiz
*Assistant Examiner* — Jared Bibbee
(74) *Attorney, Agent, or Firm* — Kacvinsky Daisak Bluni, PLLC

(57) ABSTRACT

System and method for producing tree perspectives of a plurality of storage systems using storage system descriptors and a set of search rules. The system and method herein provide an easy way to locate and identify specific storage systems. The storage system descriptors comprise external storage system metadata (referred to herein as "external metadata") and/or internal storage system attributes (referred to herein as "internal attributes") that describe the storage systems. The set of search rules comprises one or more metadata search rules and/or one or more attribute search rules. The set of search rules may be applied to the external metadata and/or internal attributes to determine a set of one or more matching storage systems. A tree perspective may be produced that represents the set of matching storage systems. The tree perspective may display the hierarchal organization of the set of matching storage systems through a hierarchical tree structure.

20 Claims, 9 Drawing Sheets

| Storage System ID | External metadata | Internal Attributes | Status |
|---|---|---|---|
| SS1 | State = CA<br>City = Palo Alto | Firmware = FW1 | Faulty |
| SS2 | State = CA<br>City = Palo Alto | Firmware = FW3 | Operational |
| SS3 | State = CA<br>City = Palo Alto | Firmware = FW2 | Operational |
| SS4 | State = CA<br>City = San Jose | Firmware = FW3 | Operational |
| SS5 | State = CA<br>City = San Jose | Firmware = FW1 | Operational |
| SS6 | State = CO<br>City = Boulder | Firmware = FW1 | Operational |
| ... | ... | ... | ... |

FIG. 6

SYSTEM AND METHOD FOR PRODUCING TREE PERSPECTIVES OF STORAGE SYSTEMS

FIELD

Embodiments of the present disclosure relate to storage systems, and in particular, a system and method for producing tree perspectives of storage systems.

BACKGROUND

A storage system typically comprises one or more storage devices for storing client data. The storage system includes a storage operating system that functionally organizes the system by, inter alia, invoking storage operations in support of a storage service implemented by the system. The storage system may be implemented in accordance with a variety of storage architectures including, but not limited to, a network-attached storage environment, a storage area network and a disk assembly directly attached to a client or host computer. For example, the storage devices may be organized as a storage array. In some embodiments, a storage device may comprise a disk device commonly described as a self-contained rotating magnetic media storage device, such as a hard disk drive (HDD) or direct access storage device (DASD). In other embodiments, a storage device may comprise another type of storage device.

The storage operating system of the storage system may implement a high-level module, such as a file system, to logically organize the information stored on volumes as a hierarchical structure of storage objects, such as files and logical units (LUs). A known type of file system is a write-anywhere file system that does not overwrite data on disks. An example of a write-anywhere file system that is configured to operate on a storage system is the Write Anywhere File Layout (WAFL®) file system available from NetApp, Inc. Sunnyvale, Calif.

The storage system may be further configured to allow many servers to access storage objects stored on the storage system. In this model, the server may execute an application, such as a database application, that "connects" to the storage system over a computer network, such as a point-to-point link, shared local area network (LAN), wide area network (WAN), or virtual private network (VPN) implemented over a public network such as the Internet. Each server may request the data services of the storage system by issuing access requests (read/write requests) as file-based and block-based protocol messages (in the form of packets) to the system over the network.

A plurality of storage systems may be interconnected to provide a cluster architecture configured to service many servers. The storage systems of the cluster may be configured to communicate with one another to act collectively to increase performance or to offset any single storage system failure within the cluster. The cluster provides data service to servers by providing access to a shared storage (comprising a set of storage devices). Typically, servers will connect with a storage system of the cluster for data-access sessions with the storage system. During a data-access session with a storage system, a server may submit access requests (read/write requests) that are received and performed by the storage system.

A manager server may be used to manage a large number of storage systems for performing maintenance, monitoring, or other management functions on the storage systems. Currently, a simple list of the storage systems may be used to identify a specific storage system. However, when managing an increasingly large number of storage systems, it becomes more difficult to identify a specific storage system or identify faulty storage systems needing attention using the current simple lists. For example, a manager server may manage hundreds or thousands of storage systems, and an administrator would typically need to analyze the entire list of storage systems to identify specific storage systems. As such, there is a need for a better method of managing and identifying storage systems for allowing an administrator to manage a large number of storage systems.

SUMMARY

The embodiments described herein provide a system and method for producing tree perspectives of a plurality of storage systems using storage system descriptors and a set of search rules. The system and method herein provide a way to quickly and easily locate and identify specific storage systems. In some embodiments, the storage system descriptors comprise external storage system metadata (referred to herein as "external metadata") and/or internal storage system attributes (referred to herein as "internal attributes") that describe the storage systems. In some embodiments, the set of search rules comprises one or more metadata search rules and/or one or more attribute search rules. The set of search rules may be applied to the external metadata and/or internal attributes to determine a set of one or more matching storage systems. A tree perspective may be produced that represents the set of matching storage systems. The tree perspective may display the hierarchal organization of the set of matching storage systems through a hierarchical tree structure.

The external metadata for a storage system may comprise descriptions of the storage system that are received from a user/administrator. External metadata may comprise descriptions that are externally imposed on a storage system in that they are artificially or arbitrarily imposed on a storage system by a user/administrator, depending on the requirements of the user/administrator. Examples of different types of external metadata include metadata that relates to the geographical location of the storage system (e.g., "Country," "State," "City," etc.), the users/owners of the storage system (e.g., "Users," "Owners," "UserGroup," etc.), the storage purpose/use of the storage system (e.g., "Purpose," "PrimaryUse," etc.), etc. For each storage system, each type of external metadata may comprise one or more values. For example, the types of metadata that relate to the geographical location of the storage system may comprise one value (e.g., "USA" for metadata type "Country," "California" for metadata type "State," "Palo Alto" for metadata type "City," etc.). The types of metadata that relate to the users/owners of the storage system may comprise one or more values (e.g., "Administrators" and "Engineers" for metadata type "UserGroup," etc.). The types of metadata that relate to the storage purpose/use of the storage system may also comprise one or more values (e.g., "Email exchange" and "File database" for metadata type "Purpose"). In other embodiments, external metadata of other types are used. External metadata for each storage system may be transmitted and stored to the storage system.

In some embodiments, the internal attributes for a storage system may comprise descriptions of the storage system that are not produced/created by an administrator. Internal attributes may comprise descriptions that relate to physical, technical, or configuration properties or specifications of the storage system. As such, internal attributes are not artificially or arbitrarily imposed on a storage system by an administrator. Examples of different types of internal attributes include firmware version and model type/number of the storage system, and interface/storage device types supported by the storage system, etc. In other embodiments, other internal attributes are used. The internal attributes are typically already part of the system information for each storage system and do not need to be generated and stored to the storage system.

A manager server may be connected with the plurality of storage systems through a network. The manager server may execute a manager engine that manages and communicates with the storage systems (e.g., for performing maintenance, monitoring, or other management functions on the storage systems). Each storage system may have an associated storage system identifier (ID) that uniquely identifies the storage system among the plurality of storage systems. Each storage system may also execute a descriptor engine. In some embodiments, the manager engine on the server may operate in conjunction with the descriptor engines on the storage systems to perform embodiments described herein.

In some embodiments, the manager engine receives external metadata for each storage system (e.g., from an user/administrator). Each storage system may comprise a local storage for storing system data/information and a plurality of storage devices for storing client data. The manager engine may transmit, via the network, the external metadata corresponding to each storage system to the descriptor engine of each storage system. In some embodiments, each descriptor engine receives the external metadata and stores the external metadata to a predetermined storage location on the local storage of the storage system. Note that internal attributes are typically already part of the system information for each storage system and do not need to be generated and stored to the storage system.

In some embodiments, a search of the storage systems and a resulting tree perspective produced for the search may be based only on the external metadata of the storage systems, based only on the internal attributes of the storage systems, or based on the external metadata and internal attributes of the storage systems. In these embodiments, the manager engine may receive a set of search rules (e.g., from an administrator). The set of search rules may comprise one or more metadata search rules and/or one or more attribute search rules. Each metadata search rule may specify a particular type of external metadata and one or more values for the type of external metadata. For example, a metadata search rule may specify a "State" metadata type with a value of "California" or a wildcard value (indicating all possible values of "State"). Each attribute search rule may specify a particular type of internal attribute and one or more values for the type of internal attribute. For example, an attribute search rule may specify a "Firmware" attribute type with a specific desired value or a wildcard value (indicating all possible values of "Firmware").

The manager engine may then retrieve, through the network, the external metadata and/or internal attributes from each storage system. In some embodiments, the manager engine also retrieves a status indicator from each storage system that indicates whether or not the storage system comprises any hardware and/or software components that are faulty or malfunctioning and requires attention (e.g., maintenance or repair). For example, a "faulty" status indicator from a storage system may indicate the storage system is faulty or malfunctioning (e.g., a storage device is not operating correctly, the operating system has crashed, etc.). An "operational" status indicator from a storage system may indicate the storage system is not faulty or malfunctioning and is operating normally.

The manager engine may comprise and implement a set of application programming interfaces (APIs) for interfacing and communicating with the storage systems. The manager engine, the APIs, and descriptor engine of each storage system may operate in conjunction to retrieve and transmit, via the network, the external metadata, internal attributes, and/or status indicator and storage system ID from each storage system to the manager engine. The retrieved external metadata, internal attributes, and/or status indicator for each storage system may then be stored to a descriptor data structure, along with the corresponding storage system ID for each storage system. The descriptor data structure (e.g., file) may be stored locally on the manager server.

The manager engine may then apply the set of search rules to the external metadata and/or internal attributes (stored in the descriptor data structure) to determine a set of one or more matching storage systems. The manager engine may do so by applying each metadata search rule to the retrieved external metadata and each attribute search rule to the internal attributes. Each matching storage system may have associated external metadata and/or internal attributes that comply with and satisfy the set of search rules. The manager engine may produce a tree perspective displaying the set of matching storage systems. The tree perspective may comprise a hierarchical structure comprising a plurality of nodes arranged in parent/child relationships and a plurality of hierarchical levels. Each node may represents a search rule or a matching storage system. A hierarchical level may be based on and defined by a search rule and a plurality of search rules may produce a plurality of hierarchical levels. In some embodiments, the hierarchical structure of the tree perspective may be determined based on the order of the search rules in the set of search rules.

Each node in the tree perspective may be identified by a unique identifier. A parent node in the tree perspective may represent a search rule and have a child node representing another search rule or a matching storage system. A node representing a search rule may be identified by the value of the search rule (e.g., "California"). A child node representing a matching storage system comprises a leaf node of the tree perspective and may be identified by the storage system ID. In some embodiments, the tree perspective also displays the status for each matching storage system through the node representing the matching storage system. In these embodiments, a node representing a matching storage system having a "operational" status indicator comprises a first appearance (e.g., a green node), whereas a node representing a matching storage system having a "faulty" status indicator comprises a second appearance (e.g., a red node), the first and second appearances being different.

After the tree perspective of the matching storage systems is produced, a user/administrator may interact with the tree perspective. In these embodiments, the manager engine may provide a tree perspective comprising a user interface (UI) providing a plurality of user-interactive functions. For example, the tree perspective UI may provide functions for expanding or collapsing each parent node in the tree perspective. In some embodiments, the tree perspective UI may also provide a modifying function for each node that represents a matching storage system. The modifying function for a node allows a user/administrator to directly modify the external metadata for the matching storage system represented by the node. After receiving the modified external metadata for a matching storage system, the manager engine may transmit, through the network, the modified external metadata to the matching storage system for storage to its local storage. The manager engine may also store the modified external metadata for the matching storage system in the descriptor data structure and then dynamically re-produce the tree perspective by re-applying the set of search rules to the modified descriptor data structure.

The system and methods described herein allows administrators to quickly search and identify particular storage systems as well as storage systems requiring attention among the plurality of storage systems. It further allows administrators to easily organize and view a large number of storage system in various ways that are meaningful to the administrator based on the type of external metadata used (e.g., geographical location, users/owners, primary purpose/use, etc.). The tree perspectives produced by the searches also provide an intuitive hierarchical view of the matching storage systems and an interactive UI that provides modification of the external metadata for matching storage systems.

BRIEF DESCRIPTION OF THE DRAWINGS

FIG. 6 shows a conceptual diagram of an exemplary descriptor data structure used in some embodiments.

DETAILED DESCRIPTION

In the following description, numerous details and alternatives are set forth for purpose of explanation. However, one of ordinary skill in the art will realize that embodiments can be practiced without the use of these specific details. In other instances, well-known structures and devices are shown in block diagram form to not obscure the embodiments with unnecessary detail.

The description that follows is divided into three sections. Section I describes a storage system environment in which some embodiments operate. Section II describes methods for producing tree perspectives of the storage systems. Section III describes examples of tree perspectives.

I. Storage System Environment

Figure 1:
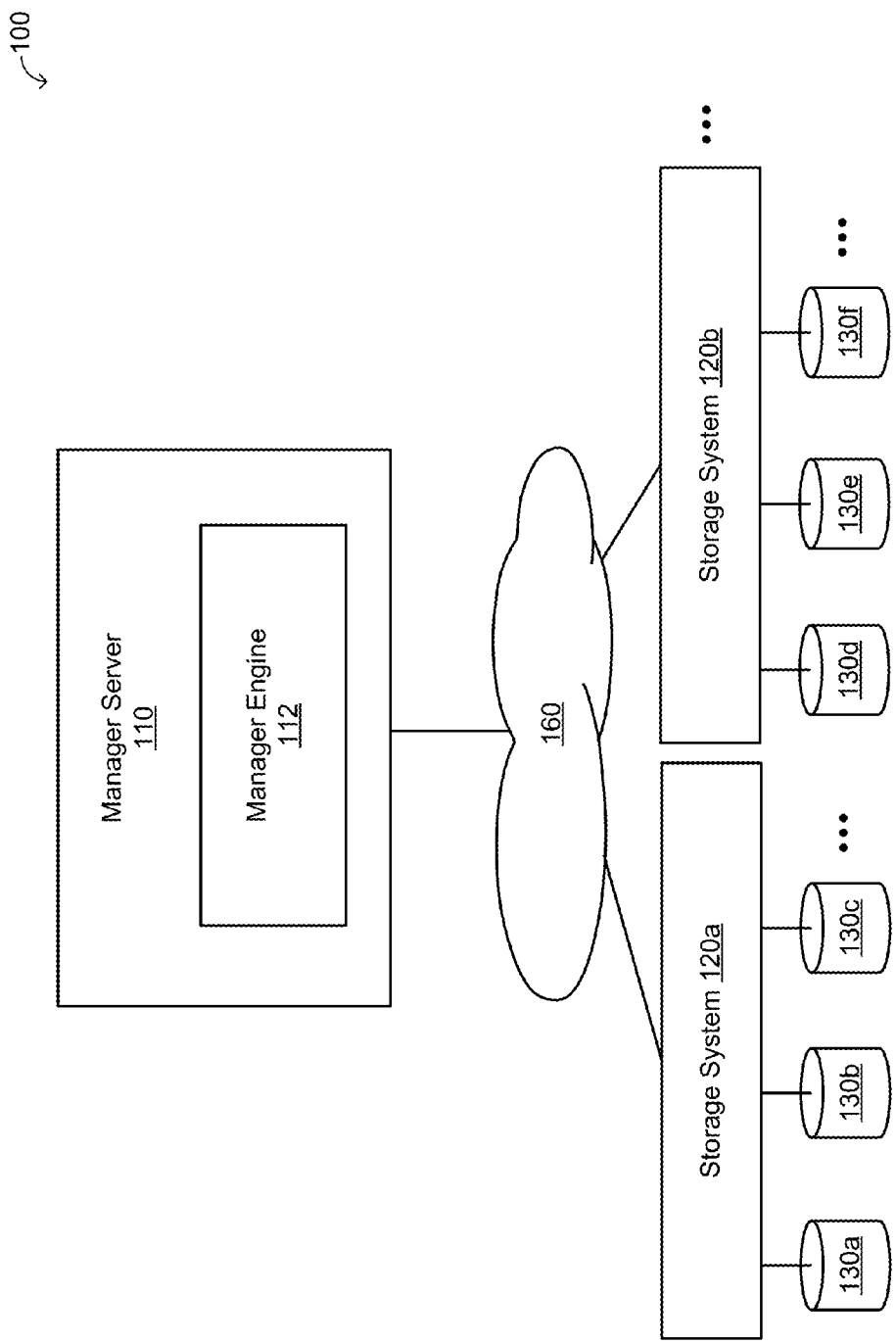
FIG. 1 is a schematic diagram of an exemplary storage system environment in which some embodiments operate.

FIG. 1 is a block diagram of an exemplary storage system environment 100 in which some embodiments operate. The environment 100 may comprise a manager server 110 connected to a plurality of storage systems 120 (e.g., storage systems 120a, 120b, etc.) via a network 160. Each storage system 120 may comprise a set of storage devices 130 (e.g., storage devices 130a, 130b, 130c, etc.) for storing client data. The manager server 110 may comprise a computer system that executes a manager engine or application 112 that may interact and communicate with the storage systems 120 for managing the storage systems 120.

Each storage system 120 may be coupled to the manager server 110 over a network 160 such as a local area network (LAN), an Ethernet subnet, a PCI or PCIe subnet, a switched PCIe subnet, a wide area network (WAN), a metropolitan area network (MAN), the Internet, or the like. Interaction between the manager server 110 and the storage system(s) 120 can enable the provision of management services. The manager server 110 may request particular services of the storage system(s) 120 (by submitting requests), and the storage system(s) 120 may respond to the requests of the manager server 110 by receiving or transmitting data to the manager server 110 over the network 160 (e.g., by exchanging data packets through a connection over the network 160).

Communications between a storage system 120 and the manager server 110 are typically embodied as packets sent over the computer network 160. The manager server 110 may request the services of the storage system 120 by issuing storage-access protocol messages formatted in accordance with a conventional storage-access protocol for accessing storage devices (such as CIFS, NFS, etc.). Access requests (e.g., read/write access requests) may be implemented by issuing packets using file-based access protocols—such as the Common Internet File System (CIFS) protocol or Network File System (NFS) protocol—over the Transmission Control Protocol/Internet Protocol (TCP/IP) when accessing data in the form of files and directories. Alternatively, the manager server 110 may issue access requests by issuing packets using block-based access protocols—such as the Fibre Channel Protocol (FCP), Fibre Channel over Ethernet (FCoE), or Internet Small Computer System Interface (iSCSI) Storage Area Network (SAN) access—when accessing data in the form of blocks.

Each storage system 120 may comprise a computer system that stores client data in a set of one or more storage devices 130. A storage device may refer to a non-volatile storage device for computer data storage of client data. A storage device 130 may comprise writable storage device media such as storage devices, video tape, optical devices, DVD, magnetic tape, flash memory, Magnetic Random Access Memory (MRAM), Phase Change RAM (PRAM), or any other similar media adapted to store information (including data and parity information).

Figure 2:
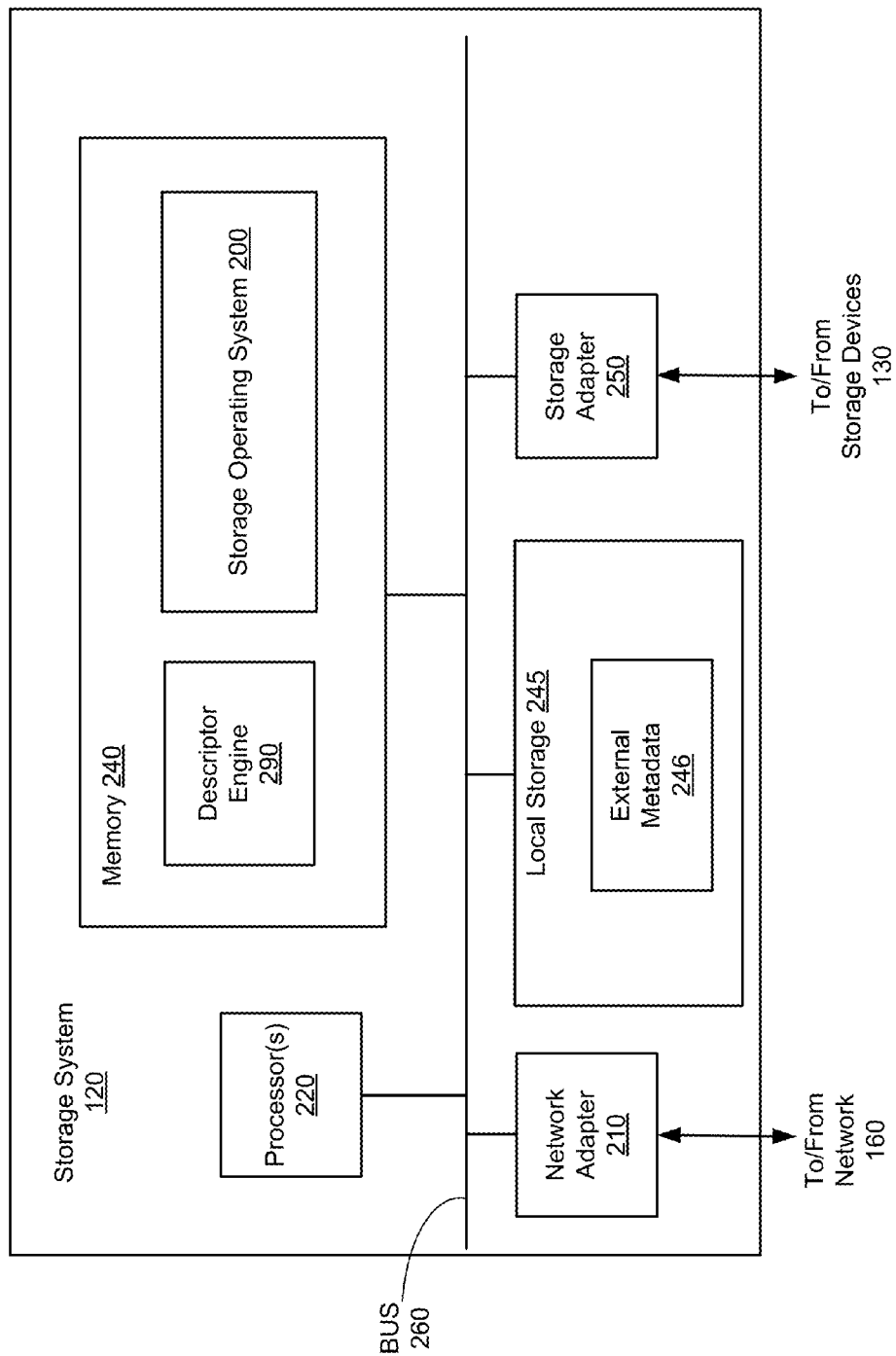
FIG. 2 is a schematic block diagram of an exemplary storage system 120 that may be employed in the storage system environment of FIG. 1.

FIG. 2 is a schematic block diagram of an exemplary storage system 120 that may be employed in the storage system environment of FIG. 1. Those skilled in the art will understand that the embodiments described herein may apply to any type of special-purpose computer (e.g., storage system) or general-purpose computer, including a standalone computer, embodied or not embodied as a storage system. To that end, storage system 120 can be broadly, and alternatively, referred to as a computer system. Moreover, the teachings of the embodiments described herein can be adapted to a variety of storage system architectures including, but not limited to, a network-attached storage environment, a storage area network and disk assembly directly-attached to a server computer. The term "storage system" should, therefore, be taken broadly to include such arrangements.

The storage system 120 comprises a network adapter 210, one or more processors 220, a memory 240, a local storage device 245, and a storage adapter 250 interconnected by a system bus 260. The network adapter 210 comprises the mechanical, electrical and signaling circuitry needed to connect the storage system 120 to a manager server 110 over a computer network. The storage system may include one or more network adapters. Each network adapter 210 has a unique Internet Protocol (IP) address and may provide one or more data access ports, e.g., for the manager server 110 to access the storage system 120. In some embodiments, the storage adapter 250 and the network adapter 210 may comprise a single unified target adapter (UTA) that may be used to perform the functionality of both the storage adapter 250 and the network adapter 210.

The memory 240 comprises storage locations that are addressable by the processor 220 and adapters for storing software program code and data. The memory 240 may comprise a form of random access memory (RAM) that is generally cleared by a power cycle or other reboot operation (e.g., it is a "volatile" memory). In other embodiments, however, the memory 240 may comprise a non-volatile form of memory that does not require power to maintain information. The processor 220 and adapters may, in turn, comprise processing elements and/or logic circuitry configured to execute the software code and manipulate the data stored in the memory 240.

The processor 220 executes a storage operating system application 200 of the storage system 120 that functionally organizes the storage system by, inter alia, invoking storage operations in support of a file service implemented by the storage system. In some embodiments, the storage operating system 200 comprises a plurality of software layers that are executed by the processor 220. Portions of the storage operating system 200 are typically resident in memory 240. It will be apparent to those skilled in the art, however, that other processing and memory means, including various computer readable media, may be used for storing and executing program instructions pertaining to the storage operating system 200. As discussed herein, the term "storage operating system" as used herein with respect to a storage system generally refers to the computer-executable code operable on a storage system that implements file system semantics (such as the above-referenced WAFL®) and manages data access. In this sense, Data ONTAP® software is an example of such a storage operating system implemented as a microkernel. The storage operating system can also be implemented as an application program operating over a general-purpose operating system, such as UNIX® or Windows®, or as a general-purpose operating system with configurable functionality.

The storage adapter 250 cooperates with the storage operating system 200 executing on the storage system 120 to access client data. The client data may be stored on the storage devices 130 that are attached, via the storage adapter 250, to the storage system 120 or other node of a storage system as defined herein. The storage adapter 250 includes input/output (I/O) interface circuitry that couples to the storage devices 130 over an I/O interconnect arrangement, such as a conventional high-performance, Fibre Channel serial link topology. In response to an access request, data may be retrieved by the storage adapter 250 and, if necessary, processed by the processor 220 (or the adapter 250 itself) prior to being forwarded over the system bus 260 to the network adapter 210, where the data may be formatted into a packet and returned to the requesting server.

In an illustrative embodiment, the storage devices 130 may comprise disk devices that are arranged into a plurality of volumes, each having a file system associated therewith. In some embodiments, the storage devices 130 comprise disk devices that are configured into a plurality of RAID (redundant array of independent disks) groups whereby multiple storage devices 130 are combined into a single logical unit (i.e., RAID group). In a typical RAID group, storage devices 130 of the group share or replicate data among the disks that may increase data reliability or performance. The storage devices 130 of a RAID group are configured so that some disks store striped data and at least one disk stores separate parity for the data, in accordance with a preferred RAID-4 configuration. However, other configurations (e.g. RAID-5 having distributed parity across stripes, RAID-DP, etc.) are also contemplated. A single volume typically comprises a plurality of storage devices 130 and may be embodied as a plurality of RAID groups.

In some embodiments, each storage system 120 may execute a descriptor engine 290 that is resident in memory 240. In these embodiments, the manager engine 112 on the manager server 110 may operate in conjunction with the descriptor engines 290 on the storage systems 120 to perform embodiments described herein. For example, the manager engine 112 may determine and transmit, via the network 160, external metadata 246 for the storage system to the descriptor engine 290, which then stores the external metadata 246 to a predetermined storage location on the local storage device 245 of the storage system 120.

Also, each storage system 120 has an associated storage system identifier (ID) that uniquely identifies the storage system among the plurality of storage systems. For example, a storage system ID may comprise a name designated by an administrator, an IP address of the storage system, etc. In some embodiments, the manager engine 112 may determine or receive (e.g., from an administrator) a storage system ID for each storage system 120 and transmit the storage system ID to each storage system 120, which then stores the storage system ID to a predetermined storage location on the local storage device 245. In other embodiments, the storage system ID for each storage system 120 is produced and stored using a different manner known in the art.

The storage devices 130 are used for storing client data, whereas the local storage device 245 is typically not used for storing client data. In these embodiments, the local storage device 245 is used for storing system data/information (e.g., for system operations, configuration information, etc.). A local storage device 245 may comprise a writable storage device, such as non-volatile random access memory (NVRAM), solid state device, disk device, and any other similar media adapted to store computer data. In some embodiments, the local storage device 245 may store external metadata 246 and an assigned storage system ID.

Figure 3:
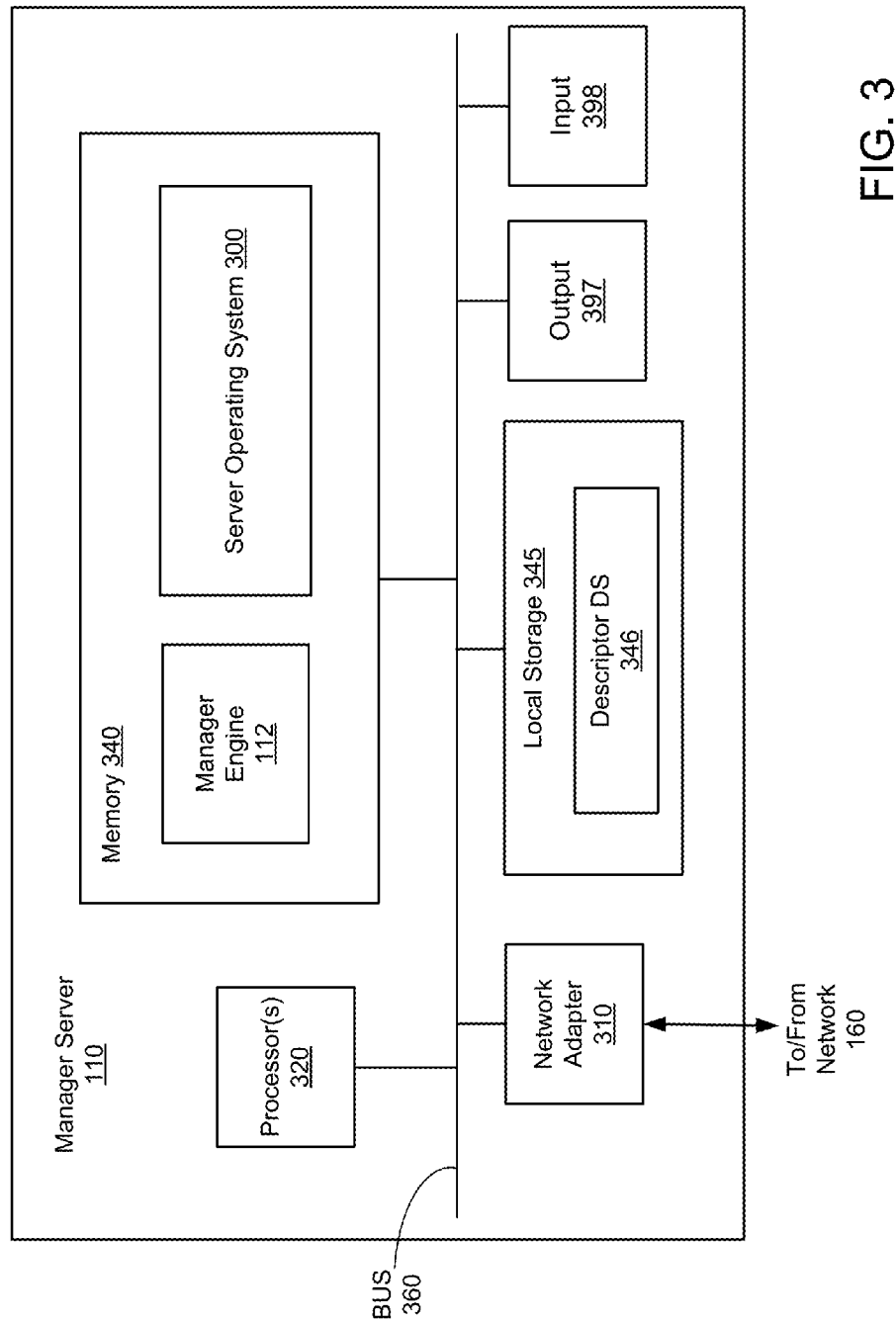
FIG. 3 is a schematic block diagram of an exemplary manager server 110 that may be employed in the storage system environment of FIG. 1.

FIG. 3 is a schematic block diagram of an exemplary manager server 110 that may be employed in the storage system environment of FIG. 1. Those skilled in the art will understand that the embodiments described herein may apply to any type of special-purpose computer (e.g., storage system) or general-purpose computer, including a standalone computer. To that end, manager server 110 can be broadly, and alternatively, referred to as a computer system.

The manager server 110 comprises a network adapter 310, one or more processors 320, a memory 340, and a local storage device 345, an output component 397, and an input component 398 coupled and interconnected by a system bus 360. The manager server 110 may comprise computer hardware and software similar to the components of the storage system 120, and those components are not discussed in detail here. The processor 320 executes a server operating system application 300 of the manager server 110. The server operating system can be implemented as an application program operating over a general-purpose operating system, such as UNIX® or Windows®, or as a general-purpose operating system with configurable functionality. Portions of the server operating system 300 are typically resident in memory 340.

The output component 397 may be of any type generally used by a computer system to provide information to an end user (e.g., administrator). For example, the output component 397 could include a monitor, an audio speaker, or an alphanumeric display. Similarly, the input component 398 may be of any type that allows an end user to provide input into a computer system. For example, the input component 398 may be a keyboard, a mouse, or a speech recognition system.

In some embodiments, each manager server 110 may execute a manager engine 112 that is resident in memory 340. The manager engine 112 may comprise and implement a set of application programming interfaces (APIs) for interfacing and communicating with the storage systems. As known in the art, an API may provide a format used by an application to communicate with an operating system or other such program. For example, an API may be implemented by writing function calls within the application, whereby a driver program on the computer is available to perform the required function.

The manager engine 112, its APIs, and the descriptor engine 290 of each storage system 120 may operate in conjunction to perform embodiments herein, e.g., to receive and transmit, via the network, the external metadata, internal attributes, and/or status indicator and storage system ID from each storage system 120 to the manager engine 112. The received external metadata, internal attributes, and/or status indicator for each storage system may then be stored to a descriptor data structure 346 (along with the corresponding storage system ID for each storage system) on the local storage device 345 of the manager server 110. The manager engine may then receive and apply a set of search rules to the external metadata and/or internal attributes (stored in the descriptor data structure) to produce a tree perspective of a set of one or more matching storage systems.

II. Methods for Producing Tree Perspectives of Matching Storage Systems

The embodiments described herein provide a system and method for producing tree perspectives of a plurality of storage systems using storage system descriptors and a set of search rules. The system and method herein provide a way to quickly and easily locate and identify specific storage systems. In some embodiments, the storage system descriptors comprise external storage system metadata (referred to herein as "external metadata") and/or internal storage system attributes (referred to herein as "internal attributes") that describe the storage systems. In some embodiments, the set of search rules comprises one or more metadata search rules and/or one or more attribute search rules. The set of search rules may be applied to the external metadata and/or internal attributes to determine a set of one or more matching storage systems. A tree perspective may be produced that represents the set of matching storage systems. The tree perspective may display the hierarchal organization of the set of matching storage systems through a hierarchical tree structure.

A. Method for Preparing and Storing External Metadata for each Storage System

Figure 4:
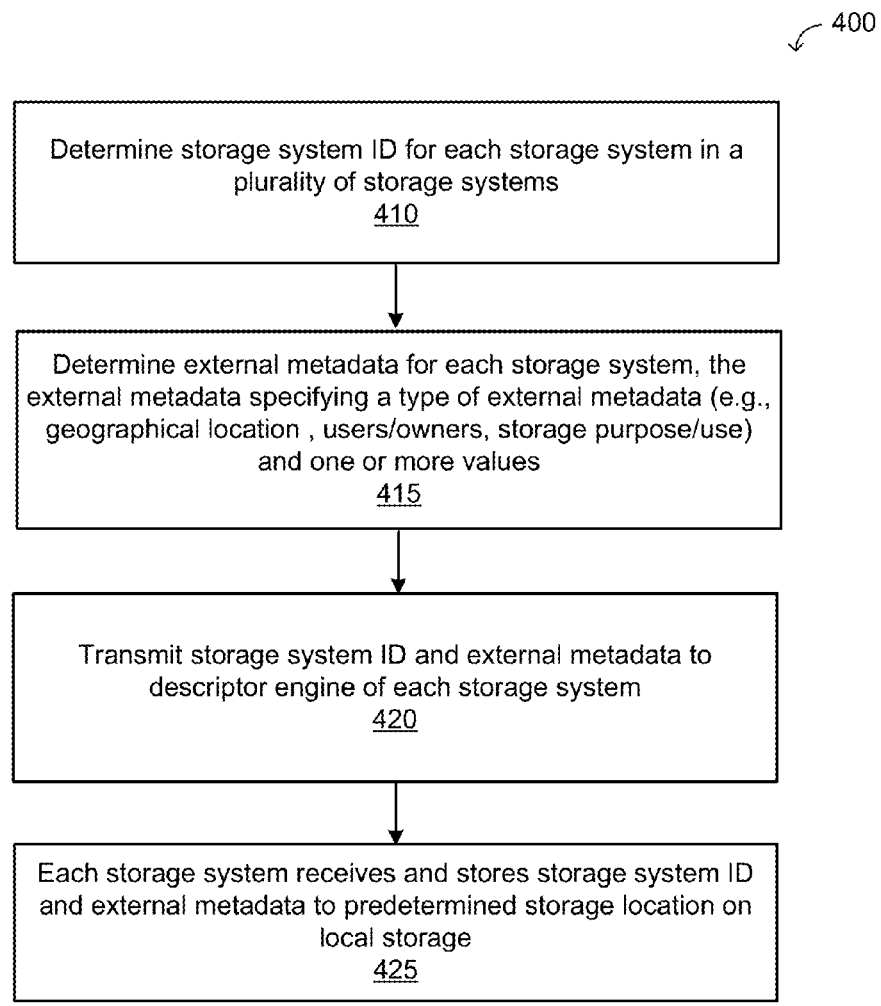
FIG. 4 is a flowchart of a preparation technique 400 for determining and storing external metadata in accordance with some embodiments.

FIG. 4 is a flowchart of a preparation technique 400 for determining and storing external metadata in accordance with some embodiments. In these embodiments, the manager server 110 may be connected with the plurality of storage systems 120 through a network 160 (as shown in FIG. 1). The manager server may execute a manager engine 112 that manages and communicates with the storage systems (e.g., for performing maintenance, monitoring, or other management functions on the storage systems). In some embodiments, some of the steps of technique 400 are performed or caused to be performed by the manager engine 112 executing on the manager server 110 and the descriptor engine 290 executing on each storage system 120 being configured to perform steps of the technique 400. The manager engine 112 and descriptor engines 290 may be configured to operate in conjunction with other software modules of the storage system 120, manager server 110, such as software modules of the storage operating system 200, server operating system 300, and APIs to collectively perform the embodiments described herein. The order and number of steps of the technique 400 are for illustrative purposes only and, in other embodiments, a different order and/or number of steps are used.

The technique 400 begins by the manager engine 112 determining (at step 410) a storage system ID for each storage system in a plurality of storage systems. For example, a storage system ID may comprise a name designated by an administrator, an IP address of the storage system, etc. In some embodiments, the manager engine 112 may receive (e.g., from an administrator) a storage system ID for each storage system 120. In other embodiments, the storage system ID for each storage system 120 is determined using a different manner known in the art. As such, each storage system 120 has an associated storage system ID that uniquely identifies the storage system among the plurality of storage systems.

The manager engine 112 then determines (at step 415) external metadata for each storage system in the plurality of storage systems. In some embodiments, the manager engine 112 may receive (e.g., from an administrator) external metadata for each storage system 120. The external metadata for a storage system may comprise descriptions of the storage system that are produced/created by a user/administrator. External metadata may comprise descriptions that are externally imposed on a storage system in that they are artificially or arbitrarily imposed on a storage system by a user/administrator, depending on the requirements of the user/administrator.

Examples of different types of external metadata include metadata that relates to the geographical location of the storage system (e.g., "Country," "State," "City," etc.), the users/owners or user/owner groups of the storage system (e.g., "Users," "Owners," "UserGroup," etc.), the storage purpose/use of the storage system (e.g., "Purpose," "PrimaryUse," etc.), etc. For each storage system, each type of external metadata may comprise one or more values. For example, the types of metadata that relate to the geographical location of the storage system may comprise one value (e.g., "USA" for metadata type "Country," "California" for metadata type "State," "Palo Alto" for metadata type "City," etc.). The types of metadata that relate to the users/owners of the storage system may comprise one or more values (e.g., "Administrators" and "Engineers" for metadata type "UserGroup," etc.). The types of metadata that relate to the storage purpose/use of the storage system may also comprise one or more values (e.g., "Email exchange" and "File database" for metadata type "Purpose"). In other embodiments, external metadata of other types are used.

In some embodiments, the external metadata for a storage system comprises a set of one or more key/value pairs. A key may comprise a specific type of external metadata, such as "State," "UserGroup," or "Purpose." Each key may have one or more specified values. For example, the key "State" may have one specific value (such as "California") indicating that the storage system is geographically located in California. For example, the key "UserGroup" may have one or more values (such as "Administrators" and "Engineers") indicating that the user groups "Administrators" and "Engineers" are both using the storage system. For example, the key "Purpose" may have one or more values (such as "Email exchange" and "File database") indicating that the storage system is being used for storing an email exchange and file database.

At step 420, for each storage system, the manager engine 112 then transmits, via the network 160, the storage system ID and external metadata determined for the storage system to the descriptor engine 290 of the storage system 120. At step 425, the descriptor engine 290 of each storage system 120 receives and stores the storage system ID and external metadata 246 to a predetermined storage location on the local storage 245 of the storage system. In these embodiments, each storage system may comprises a local storage 245 for storing system data/information and not for storing client data. Note that internal attributes and status indicators are typically already part of the system information for each storage system and do not need to be generated and stored to the storage system. The technique 400 then ends.

B. Method for Performing Search and Producing Tree Perspective

The manager engine 112 may perform a search of the plurality of storage systems and produce a tree perspective for the search. In some embodiments, a search of the storage systems and the resulting tree perspective may be based only on the external metadata of the storage systems, based only on the internal attributes of the storage systems, or based on the external metadata and internal attributes of the storage systems.

Figure 5A:
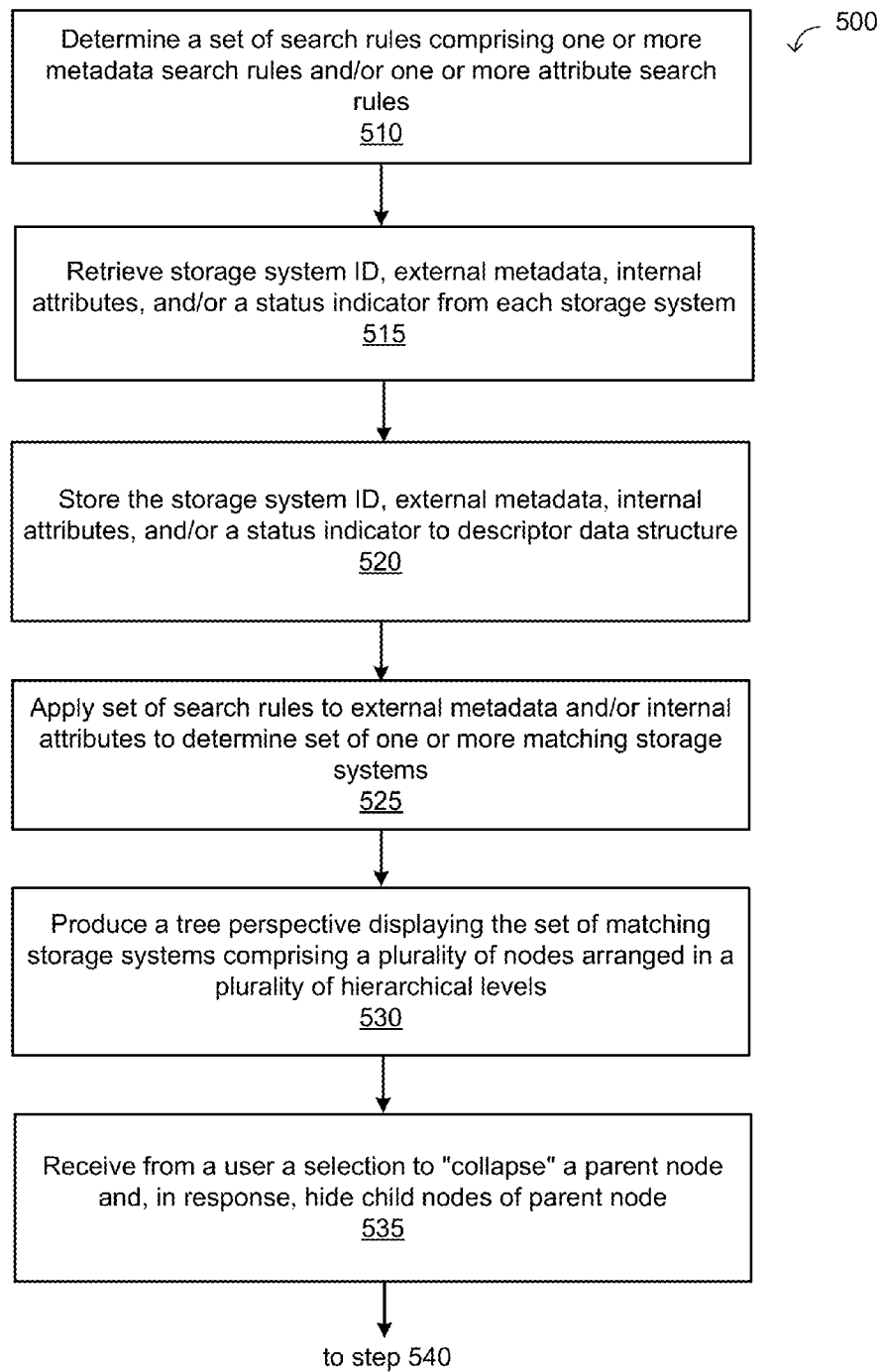
FIGS. 5A-B are a flowchart of a technique 500 for performing a search and producing a tree perspective in accordance with some embodiments.
Figure 5B:
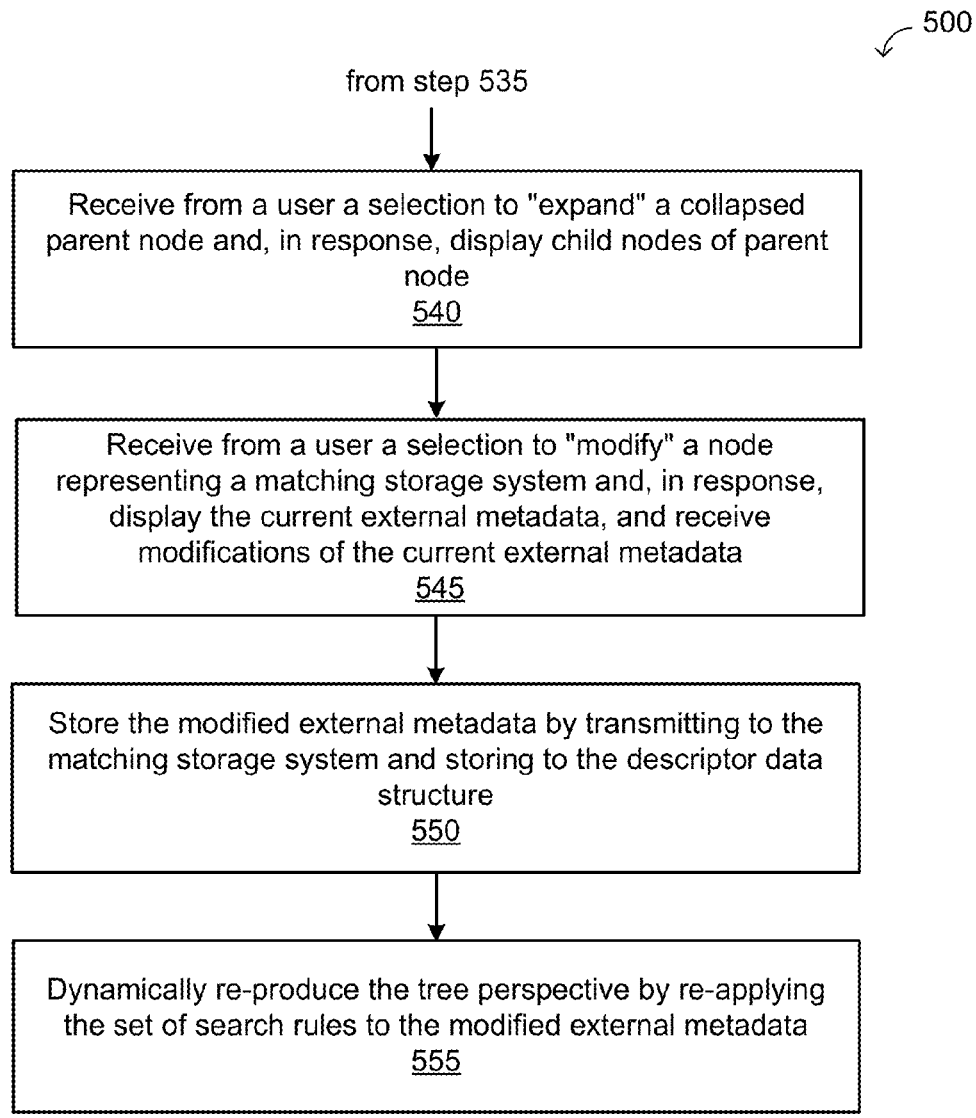

FIGS. 5A-B are a flowchart of a technique 500 for performing a search and producing a tree perspective in accordance with some embodiments. In these embodiments, the manager server 110 may be connected with the plurality of storage systems 120 through a network 160 (as shown in FIG. 1). The manager server may execute a manager engine 112 that manages and communicates with the storage systems. The manager engine 112 may comprise and implement a set of APIs for interfacing and communicating with the storage systems. In some embodiments, some of the steps of technique 500 are performed or caused to be performed by the manager engine 112 (and its APIs) executing on the manager server 110 and the descriptor engine 290 executing on each storage system 120, being configured to perform steps of the technique 500. The manager engine 112 and descriptor engines 290 may be configured to operate in conjunction with other software modules of the storage system 120, manager server 110, such as software modules of the storage operating system 200, and the server operating system 300 to collectively perform the embodiments described herein. The order and number of steps of the technique 500 are for illustrative purposes only and, in other embodiments, a different order and/or number of steps are used. The technique 500 may be repeated a plurality of times to produce a plurality of different tree perspectives.

The technique 500 begins by the manager engine 112 determining (at step 510) a set of search rules comprising one or more metadata search rules and/or one or more attribute search rules. In some embodiments, the manager engine 112 receives the set of search rules (e.g., from an administrator). Each metadata search rule may specify or indicate that it is a metadata search rule and each attribute search rule may specify or indicate that it is an attribute search rule. Each metadata search rule may also specify a particular type of external metadata and one or more values for the type of external metadata. As such, a metadata search rule may comprise a key/value pair, a key comprising a specific type of external metadata and having one or more values. For example, a metadata search rule may specify a "City" metadata type (key) with a value of "Palo Alto" or a wildcard value (indicating all possible values of "City"). Each attribute search rule may also specify a particular type of internal attribute and one or more values for the type of internal attribute. As such, an attribute search rule may also comprise a key/value pair, a key comprising a specific type of internal attribute and having one or more values. For example, an attribute search rule may specify a "Firmware" attribute type (key) with a specific desired value or a wildcard value (indicating all possible values of "Firmware").

The manager engine 112 may then retrieve and receive (at step 515), through the network 160, the storage system ID, external metadata, internal attributes, and/or a status indicator from each storage system 120 in the plurality of storage systems. To retrieve and receive the storage system ID and external metadata for each storage system, the manager engine may submit a request, through the network, to the descriptor engine of each storage system, which then performs the request and sends, through the network, the storage system ID and external metadata to the manager engine 112. The descriptor engine of each storage system may do so by retrieving the storage system ID and external metadata from the predetermined storage location on the local storage of the storage system. The storage system ID and external metadata are discussed in detail above in relation to FIG. 4.

To retrieve the internal attributes and/or status indicator for each storage system, the manager engine 112 may implement a set of APIs for interfacing and communicating with the storage systems to request and receive the internal attributes and/or status indicator. For example, for each storage system, the manager engine 112 may use an API provided by the storage system for communicating with the storage systems to request the internal attributes and/or status indicator. The API may then return the status and various attributes of the storage system to the manager engine 112. The manager engine 112 then processes the returned information to determine the internal attributes and/or status indicator for the storage system. Also, the manager engine 112 may provide an API to the tree perspective UI. When the tree perspective UI requires the internal attributes and/or status indicator, the tree perspective UI may request this information from the manager engine 112 using the API.

In some embodiments, the internal attributes for a storage system 120 may comprise descriptions of the storage system 120 that are not produced/created by an administrator. Internal attributes may comprise descriptions that relate to physical, technical, or configuration properties or specifications of the storage system. As such, internal attributes are not artificially or arbitrarily imposed on a storage system by an administrator. Examples of internal attributes include firmware version and model type/number of the storage system, and interface/storage device types (e.g., Fibre Channel, SAS, iSCSI, etc.), storage device speeds, Host Bus Adapter (HBA) types, and/or solid state storage devices supported by the storage system, etc. In other embodiments, other internal attributes are used.

In some embodiments, the internal attributes for a storage system comprises a set of one or more key/value pairs. A key may comprise a specific type of internal attributes, such as "Firmware version," "Model number," or "Storage device types." Each key may have one or more specified values. For example, the key "Firmware version" may have one specific value and the key "Model number" may have one specific value. For example, the key "Storage device types" may have one value indicating that all storage devices of the storage system are the same type, or have multiple values indicating that the storage devices of the storage system are of different types.

In some embodiments, the manager engine 112 also retrieves a status indicator from each storage system 120 that indicates whether or not the storage system 120 comprises any hardware and/or software components that are faulty or malfunctioning and requires attention (e.g., maintenance or repair). For example, a "faulty" status indicator from a storage system may indicate the storage system is faulty or malfunctioning (e.g., a storage device is not operating correctly, the operating system has crashed, etc.). An "operational" status indicator from a storage system may indicate the storage system is not faulty or malfunctioning and is operating normally.

In some embodiments, the manager engine 112 retrieves and receives from the storage systems (at step 515) only the types of external metadata and/or internal attributes that are specified in the set of search rules (determined at step 510). For example, if the set of search rules comprises only metadata search rules that specifies a "State" metadata type and a "City" metadata type, the manager engine 112 will request and receive data/information regarding only those metadata types from the storage systems. For example, if the set of search rules comprises only a metadata search rule that specifies a "State" metadata type and an attribute search rule that specifies a "Firmware" attribute type, the manager engine 112 will request and receive data/information regarding only that metadata type and that attribute type from the storage systems.

The manager engine 112 may then stores (at step 520) the storage system ID, external metadata, internal attributes, and/or a status indicator received from each storage system 120 to a descriptor data structure (DS) 346. The descriptor DS 346 may be stored to local storage 345 on the manager server 110.

FIG. 6 shows a conceptual diagram of an exemplary descriptor DS 346 used in some embodiments. The descriptor DS 346 contains a plurality of entries 601 (e.g., 601a, 601b, etc.), each entry representing a storage system 120 in the plurality of storage systems 120. In some embodiments, an entry 601 for a storage system 120 may comprise data fields for a storage system ID 605, external metadata 610, internal attributes 615, and/or status indicator 620 for the storage system 120. In the example of FIG. 6, the set of search rules comprises a metadata search rule that specifies a "State" metadata type, a metadata search rule that specifies a "City" metadata type, and an attribute search rule that specifies a "Firmware" attribute type. Accordingly, the data field for external metadata 610 for each entry 601 only stores data/information regarding the "State" and "City" metadata type and the data field for internal attributes 615 for each entry 601 only stores data/information regarding the "Firmware" attribute type.

The manager engine 112 may then apply (at step 525) the set of search rules to the external metadata and/or internal attributes (stored in the descriptor DS 246) to determine a set of one or more matching storage systems. The manager engine may do so by applying each metadata search rule to the retrieved external metadata and each attribute search rule to the internal attributes. Each matching storage system may have associated external metadata and/or internal attributes that comply with and satisfy the set of search rules. In some embodiments, for each metadata search rule, a matching storage system comprises an external metadata type and value that matches or is consistent with the external metadata type and value specified in the metadata search rule. For a metadata search rule specifying a wildcard value for an external metadata type, a matching storage system may have any value for the external metadata type to be considered "matching." In some embodiments, for each attribute search rule, a matching storage system comprises an internal attribute type and value that matches or is consistent with the internal attribute type and value specified in the attribute search rule. For an attribute search rule specifying a wildcard value for an internal attribute type, a matching storage system may have any value for the internal attribute type to be considered "matching."

The manager engine 112 may then produce (at step 530) a tree perspective displaying the set of matching storage systems. The tree perspective may comprise a hierarchical structure comprising a plurality of nodes arranged in a plurality of hierarchical levels and parent/child relationships. Each node in the tree perspective may be identified by a unique identifier. A parent node in the tree perspective may represent a search rule and have a child node representing another search rule or a matching storage system. A node representing a search rule may be identified by a value specified by the search rule (e.g., "California"). A child node representing a matching storage system comprises a leaf node and may be identified by the storage system ID of the matching storage system. In some embodiments, the tree perspective also displays the status (e.g., "faulty" or "operational") for each matching storage system through the appearance node representing the matching storage system.

After the tree perspective of the matching storage systems is produced, a user/administrator may interact with the tree perspective. In these embodiments, the manager engine may provide a tree perspective comprising a user interface (UI) providing a plurality of user-interactive functions. The functions of the tree perspective UI may be accessed and implemented using, for example, output component(s) 397 and input component(s) 398. The following steps 535 through 555 of the technique 500 illustrate exemplary UI functions that may be provided by the tree perspective. The UI functions and the order and number of steps are for illustrative purposes only and, in other embodiments, other UI functions and a different order and/or number of steps are used.

Through the tree perspective UI, the manager engine 112 receives (at step 535), from a user, a selection to "collapse" a parent node. The parent node may comprise one or more child nodes with the parent node residing on a higher hierarchical level and each child node residing on a lower hierarchical level than the parent node. In response, the manager engine 112 may "collapse" the parent node by hiding (no longer displaying) the child nodes and the lower hierarchical levels of the child nodes in the tree perspective UI, while still displaying the parent node. Through the tree perspective UI, the manager engine 112 receives (at step 540), from a user, a selection to "expand" a collapsed parent node. In response, the manager engine 112 may "expand" the parent node by displaying the child nodes and the lower hierarchical levels of the child nodes in the tree perspective UI.

Through the tree perspective UI, the manager engine 112 receives (at step 545), from a user, a selection to "modify" a node representing a matching storage system (having current external metadata). In some embodiments, the tree perspective UI may provide a modifying function for each node that represents a matching storage system. The modifying function for a node allows a user/administrator to directly modify the external metadata for the matching storage system represented by the node. In response, the manager engine 112 then displays the current external metadata (e.g., through a pop-up window), and receives modifications of the current external metadata from the user.

The manager engine 112 then stores (at 550) the modified external metadata by transmitting, through the network 160, the modified external metadata to the matching storage system 120 (that is represented by the selected node) for storage to its local storage device 245. The manager engine 112 may also store the modified external metadata to the descriptor DS 346 (e.g., by overwriting the current external metadata with the modified external metadata in the entry 601 representing the matching storage system). The manager engine 112 may then dynamically (at 555) re-produce the tree perspective by re-applying the set of search rules to the external metadata and/or internal attributes of the descriptor DS 246 having the modified external metadata. The technique 500 then ends.

The technique 500 may be repeated a plurality of times to allow users/administrators to produce a plurality of different tree perspectives. The system and methods described herein allows users/administrators to quickly search and identify particular storage systems as well as storage systems requiring attention among the plurality of storage systems. It further allows administrators to easily organize and view a large number of storage system in various ways that are meaningful to the administrator based on the type of external metadata used (e.g., geographical location, users/owners, primary purpose/use, etc.). The tree perspectives produced by the searches also provide an intuitive hierarchical view of the matching storage systems and an interactive UI that provides modification of the external metadata for matching storage systems.

III. Examples of Tree Perspectives

As discussed above in Section II, the manager engine 112 produces a tree perspective displaying a set of matching storage systems. The tree perspective may comprise a hierarchical structure comprising a plurality of nodes arranged in a plurality of hierarchical levels and parent/child relationships. Each node in the tree perspective may be identified by a unique identifier. A parent node in the tree perspective may represent a search rule and have a child node representing another search rule or a matching storage system. A node representing a search rule may be identified by a value specified by the search rule. A child node representing a matching storage system comprises a leaf node and may be identified by the storage system ID of the matching storage system.

In some embodiments, the tree perspective also displays the status (e.g., "faulty" or "operational") for each matching storage system through the appearance node representing the matching storage system. In these embodiments, a node representing a matching storage system having a "operational" status indicator comprises a first appearance (referred to as an "operational" appearance), such as a green node, whereas a node representing a matching storage system having a "faulty" status indicator comprises a second appearance (referred to as a "faulty" appearance), such as a red node, the first and second appearances being different. In some embodiments, if a child node representing a matching storage system has a "faulty" appearance, then each parent node of the child node also comprises a "faulty" appearance. In this manner, the "faulty" appearance of a child node is "rolled up" to the upper parent nodes.

In some embodiments, each hierarchical level may be based on and defined by a search rule, whereby a plurality of search rules may produce a plurality of hierarchical levels. In some embodiments, the hierarchical structure of the tree perspective may be determined based on the order of the search rules in the set of search rules. For example, the set of search rules may comprise a first search rule appearing before a second search rule in the set of search rules. As such, the manager engine 112 may produce a first hierarchical level and a first set of nodes based on the first search rule and a second hierarchical level and a second set of nodes based on the second search rule, the first hierarchical level being higher than the second hierarchical level and the second set of nodes being child nodes of the first set of nodes.

Figure 7:
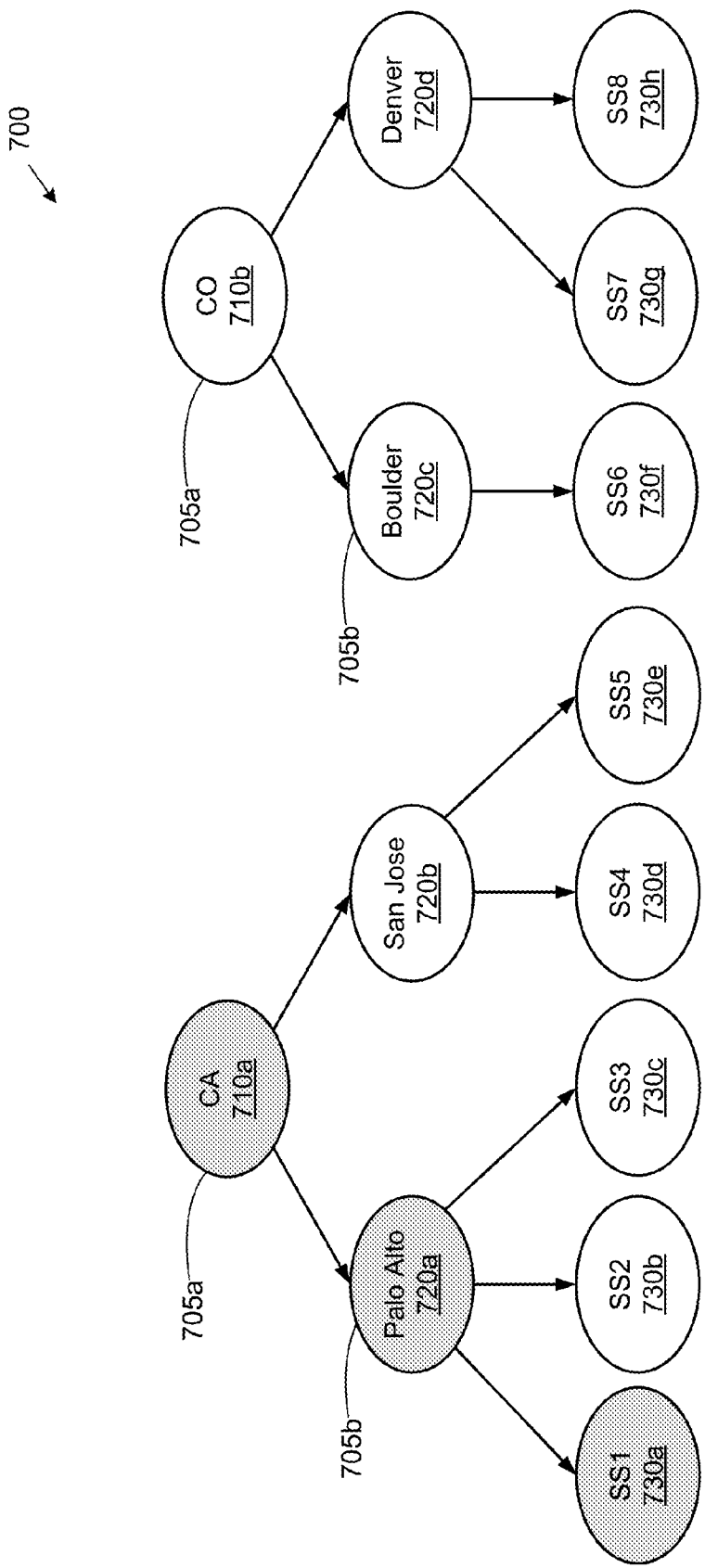
FIG. 7 shows a conceptual diagram of an exemplary tree perspective 700 produced based on external metadata of the storage systems.

FIG. 7 shows a conceptual diagram of an exemplary tree perspective 700 produced based on external metadata of the storage systems. In the example of FIG. 7, the set of search rules comprises a first metadata search rule: "Metadata rule: State=California or Colorado" and a second metadata search rule: "Metadata rule: City." As discussed above, each metadata search rule may specify or indicate that it is a metadata search rule (e.g., "Metadata rule"). The first metadata search rule specifies the key/type of external metadata comprising "State" and the two explicit values "California" or "Colorado." The second metadata search rule specifies the key/type of external metadata comprising "City" and does not specify any explicit values, which indicates a wildcard value. As such, a storage system having any value for "City" would satisfy the second metadata search rule.

As shown in FIG. 7, the tree perspective 700 comprises a plurality of nodes 705 (e.g., 705a, 705b, etc.) in parent/child relationships and arranged in a plurality of hierarchical levels indicating the parent/child relationships. For example, the tree perspective 700 may comprise a first hierarchical level comprising a first set of nodes (e.g., 710a, 710b, etc.), a second hierarchical level comprising a second set of nodes (e.g., 720a, 720b, etc.), and a third hierarchical level comprising a third set of nodes (e.g., 730a, 730b, etc.), whereby the second set of nodes are child nodes of the first set of nodes and the third set of nodes are child nodes of the second set of nodes.

In the example of FIG. 7, the first set of nodes comprises a "CA" node 710a representing the search rule "State=California" and a "CO" node 710b representing the search rule "State=Colorado." For the "CA" parent node 710a, the second set of nodes comprises a "Palo Alto" child node 720a and a "San Jose" child node 720b representing the search rule "City." For the "CO" parent node 710b, the second set of nodes comprises a "Boulder" child node 720c and a "Denver" child node 720d representing the search rule "City." In this example, "Palo Alto" and "San Jose" are the only values used for "City" for "State=California" and "Boulder" and "Denver" are the only values used for "City" for "State=Colorado." Each node in the second set of nodes has one or more child leaf nodes representing matching storage systems. For example, for the "Palo Alto" parent node 720a, the third set of nodes comprises a "SS1" child leaf node 730a representing the matching storage system having the storage system ID "SS1," a "SS2" child leaf node 730b representing the matching storage system having the storage system ID "SS1," and so forth.

As shown in FIG. 7, the "SS1" child leaf node 730a has a "faulty" appearance (e.g., is shaded) to indicate that it represents a matching storage system having a "faulty" status indicator, whereas the other child leaf nodes have an "operational" appearance (e.g., are not shaded) to indicate that they represent matching storage systems having an "operational" status indicator. In some embodiments, since the "SS1" child leaf node 730a has a "faulty" appearance, then each parent node of the child node also comprises a "faulty" appearance so that the "Palo Alto" node 720a and "CA" node 710a are also given a "faulty" appearance (e.g., are shaded).

As such, the tree perspective 700 arranges the matching storage systems in hierarchical levels based on which State and City the matching storage systems are located in and enables an administrator to easily locate storage systems that are in a specific City. Further, the tree perspective 700 allows the administrator to quickly determine which matching storage systems are operational and which are faulty and require attention.

Figure 8:
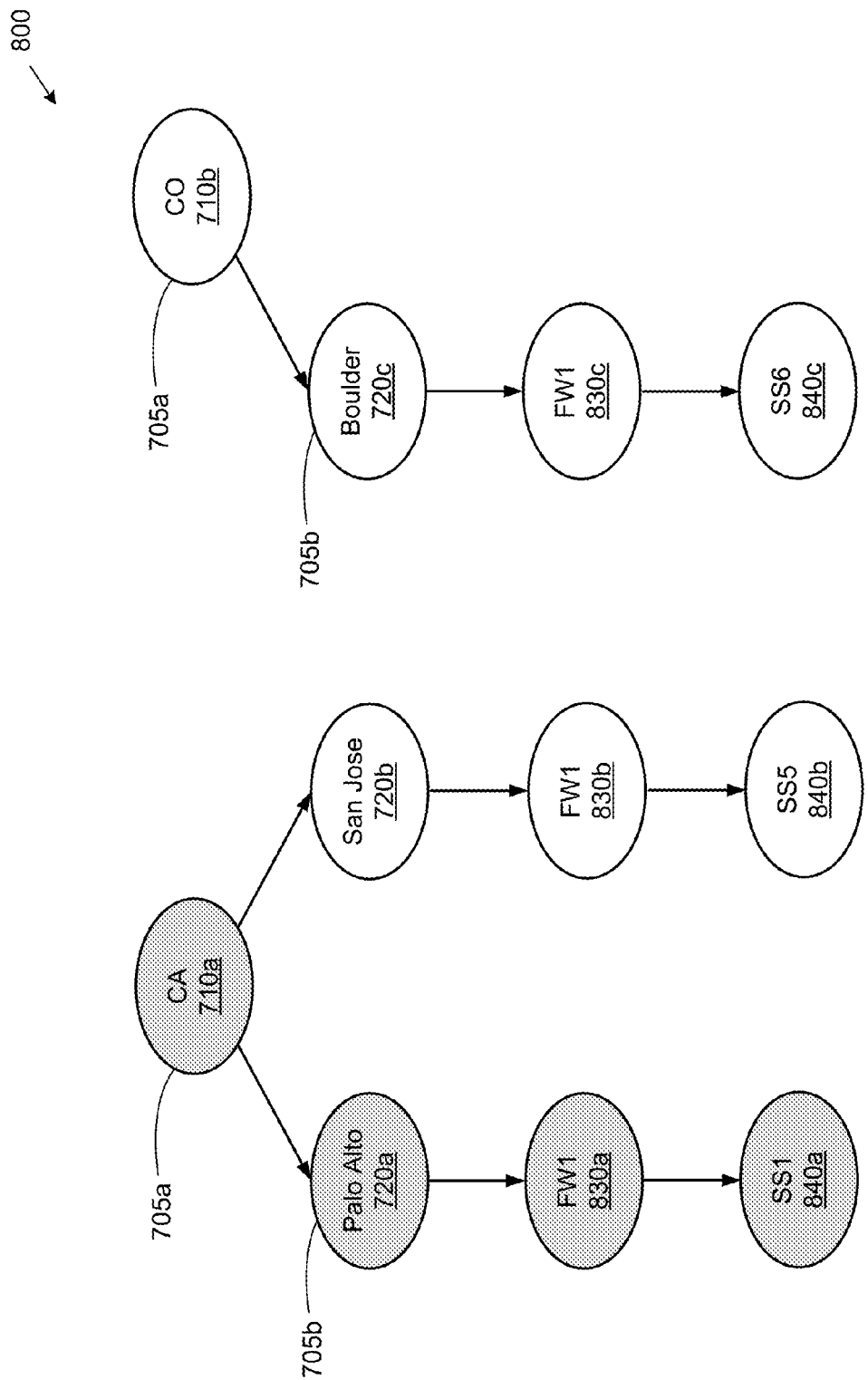
FIG. 8 shows a conceptual diagram of an exemplary tree perspective 800 produced based on external metadata and internal attributes of the storage systems.

FIG. 8 shows a conceptual diagram of an exemplary tree perspective 800 produced based on external metadata and internal attributes of the storage systems. In the example of FIG. 8, the set of search rules comprises a first search rule: "Metadata rule: State=California or Colorado," a second search rule: "Metadata rule: City" and a third search rule: "Attribute rule: Firmware=FW1." As discussed above, each attribute search rule may specify or indicate that it is an attribute search rule (e.g., "Attribute rule"). The third search rule specifies the key/type of internal attribute comprising "Firmware" version and explicit value of "FW1."

As shown in FIG. 8, the tree perspective 800 comprises a plurality of nodes 705 (e.g., 705a, 705b, etc.) in parent/child relationships and arranged in a plurality of hierarchical levels indicating the parent/child relationships. Note that the first and second hierarchical levels are similar to the tree perspective 700 of FIG. 7 and are not discussed in detail here. The tree perspective 800 of FIG. 8 comprises a third hierarchical level comprising a third set of nodes (e.g., 830a, 830b, etc.), and a fourth hierarchical level comprising a fourth set of nodes (e.g., 840a, 840b, etc.), whereby the third set of nodes are child nodes of the second set of nodes, and the fourth set of nodes are child nodes of the third set of nodes.

In the example of FIG. 8, the third set of nodes comprises "FW1" nodes 830 representing the search rule "Firmware=FW1." For the "FW1" parent node 830a, the fourth set of nodes comprises a "SS1" child leaf node 840a representing the matching storage system having the storage system ID "SS1" that has the attribute "Firmware=FW1," and so forth. As shown in the example of FIG. 8, the storage systems having storage system IDs "SS1," "SS5," and "SS6" have the firmware version "FW1." This may be useful, for example, if "FW1" is an older firmware version and the tree perspective 800 allows an administrator to easily locate the storage systems having the older firmware version and needing an updated firmware version.

Various Embodiments

Some embodiments may be conveniently implemented using a conventional general purpose or a specialized digital computer or microprocessor programmed according to the teachings herein, as will be apparent to those skilled in the computer art. Some embodiments may be implemented by a general purpose computer programmed to perform method or process steps described herein. Such programming may produce a new machine or special purpose computer for performing particular method or process steps and functions (described herein) pursuant to instructions from program software. Appropriate software coding may be prepared by programmers based on the teachings herein, as will be apparent to those skilled in the software art. Some embodiments may also be implemented by the preparation of application-specific integrated circuits or by interconnecting an appropriate network of conventional component circuits, as will be readily apparent to those skilled in the art. Those of skill in the art would understand that information may be represented using any of a variety of different technologies and techniques.

Some embodiments include a computer program product comprising a computer readable medium (media) having instructions stored thereon/in and, when executed (e.g., by a processor), perform methods, techniques, or embodiments described herein, the computer readable medium comprising sets of instructions for performing various steps of the methods, techniques, or embodiments described herein. The computer readable medium may comprise a non-transitory computer readable medium. The computer readable medium may comprise a storage medium having instructions stored thereon in which may be used to control, or cause, a computer to perform any of the processes of an embodiment. The storage medium may include, without limitation, any type of device including floppy disks, mini disks (MDs), optical disks, DVDs, CD-ROMs, micro-drives, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any other type of media or device suitable for storing instructions and/or data thereon/in.

Stored on any one of the computer readable medium (media), some embodiments include software instructions for controlling both the hardware of the general purpose or specialized computer or microprocessor, and for enabling the computer or microprocessor to interact with a human user and/or other mechanism using the results of an embodiment. Such software may include without limitation device drivers, operating systems, and user applications. Ultimately, such computer readable media further includes software instructions for performing embodiments described herein. Included in the programming (software) of the general-purpose/specialized computer or microprocessor are software modules for implementing some embodiments.

Those of skill would further appreciate that the various illustrative logical blocks, circuits, modules, algorithms, techniques, processes, or method steps of embodiments described herein may be implemented as computer electronic hardware, computer software, or combinations of both. To illustrate this interchangeability of hardware and software, various illustrative components, blocks, modules, circuits, and steps have been described herein generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the embodiments described herein.

The various illustrative logical blocks, modules, and circuits described in connection with the embodiments disclosed herein may be implemented or performed with a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The algorithm, techniques, processes, or methods described in connection with embodiments disclosed herein may be embodied directly in hardware, in software executed by a processor, or in a combination of the two. In some embodiments, any software application, program, tool, module, or layer described herein may comprise an engine comprising hardware and/or software configured to perform embodiments described herein. In general, functions of a software application, program, tool, module, or layer described herein may be embodied directly in hardware, or embodied as software executed by a processor, or embodied as a combination of the two. A software application, layer, or module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read data from, and write data to, the storage medium. In the alternative, the storage medium may be integral to the processor. The processor and the storage medium may reside in an ASIC. The ASIC may reside in a user device. In the alternative, the processor and the storage medium may reside as discrete components in a user device.

While the embodiments described herein have been described with reference to numerous specific details, one of ordinary skill in the art will recognize that the embodiments can be embodied in other specific forms without departing from the spirit of the embodiments. Thus, one of ordinary skill in the art would understand that the embodiments described herein are not to be limited by the foregoing illustrative details, but rather are to be defined by the appended claims.

What is claimed is:

1. A system, comprising at least one processor and memory, for providing a perspective of a set of storage systems, the system comprising:
   a plurality of storage systems, each storage system comprising a local storage storing metadata to a predetermined storage location, the metadata describing the storage system and comprising at least one type of metadata and one or more values for the at least one type of metadata, the at least one type of metadata relating to a geographical location of the storage system, users of the storage system, or a storage use of the storage system;
   a manager engine configured for:
   determining a set of one or more search rules, each search rule specifying a type of metadata and one or more values for the type of metadata;
   receiving the metadata for the plurality of storage systems by receiving metadata from the predetermined storage location on the local storage of each storage system
   applying the set of search rules to the received metadata to determine a set of one or more matching storage systems;
   producing a perspective of the set of matching storage systems;
   receiving from a user, through the perspective, modified metadata for a matching storage system;
   transmitting the modified metadata to the matching storage system; and
   re-applying the set of search rules to the metadata to re-produce the perspective using the modified metadata.

2. The system of claim 1,
   the perspective comprising a hierarchical structure comprising a plurality of nodes arranged in a plurality of hierarchical levels, each node representing a search rule or a matching storage system.

3. The system of claim 2, wherein:
   the hierarchical structure of the perspective is determined based on an order of the search rules in the set of search rules; and
   a hierarchical level in the perspective is defined by a search rule.

4. The system of claim 2, wherein a node representing a search rule comprises a child node representing another search rule or a matching storage system.

5. The system of claim 2, wherein:
   each node is identified by a unique identifier;
   a node representing a search rule is identified by a value of the search rule; and
   a node representing a matching storage system is identified by a storage system identifier.

6. The system of claim 2, wherein the manager engine is further configured for:
   receiving a status indicator from each storage system, the status indicator comprising an operational or faulty status indicator; and
   the perspective displays the status for each matching storage system through the node representing the matching storage system, a node representing a matching storage system having an operational status indicator comprising a first appearance and a node representing a matching storage system having a faulty status indicator comprising a second appearance, the first and second appearances being different.

7. The system of claim 1, wherein:
   the manager engine is connected to the plurality of storage systems through a network; and
   the manager engine receives the metadata for the plurality of storage systems through the network.

8. The system of claim 7, wherein the manager engine is further configured for:
   receiving, from a user, the metadata for each storage system; and
   transmitting the metadata to each storage system for storage to the local storage of each storage system.

9. A non-transitory computer readable medium having instructions stored thereon when executed by a processor, provide a perspective of a set of storage systems, the non-transitory computer readable medium comprising instructions for:
   for each storage system of a plurality of storage systems, storing metadata to a predetermined storage location of a local storage, the metadata describing the storage system and comprising at least one type of metadata and one or more values for the at least one type of metadata, the at least one type of metadata relating to a geographical location of the storage system, users of the storage system, or a storage use of the storage system;
   determining a set of one or more search rules, each search rule specifying a type of metadata and one or more values for the type of metadata;
   receiving the metadata for the plurality of storage systems by receiving metadata from the predetermined storage location on the local storage of each storage system; and
   applying the set of search rules to the received metadata to determine a set of one or more matching storage systems
   producing a perspective of the set of matching storage systems;
   receiving from a user, through the perspective, modified metadata for a matching storage system;
   transmitting the modified metadata to the matching storage system; and
   re-applying the set of search rules to the metadata to re-produce the perspective using the modified metadata.

10. The non-transitory computer readable medium of claim 9,
    the perspective comprising a hierarchical structure comprising a plurality of nodes arranged in a plurality of hierarchical levels, each node representing a search rule or a matching storage system.

11. The non-transitory computer readable medium of claim 10, wherein:
the hierarchical structure of the perspective is determined based on an order of the search rules in the set of search rules; and
a hierarchical level in the perspective is defined by a search rule.

12. The non-transitory computer readable medium of claim 10, wherein a node representing a search rule comprises a child node representing another search rule or a matching storage system.

13. The non-transitory computer readable medium of claim 10, wherein:
each node is identified by a unique identifier;
a node representing a search rule is identified by a value of the search rule; and
a node representing a matching storage system is identified by a storage system identifier.

14. The non-transitory computer readable medium of claim 10, further comprising instructions for:
receiving a status indicator from each storage system, the status indicator comprising an operational or faulty status indicator; and
the perspective displays the status for each matching storage system through the node representing the matching storage system, a node representing a matching storage system having an operational status indicator comprising a first appearance and a node representing a matching storage system having a faulty status indicator comprising a second appearance, the first and second appearances being different.

15. The non-transitory computer readable medium of claim 9, wherein:
the manager engine is connected to the plurality of storage systems through a network; and
the manager engine receives the metadata for the plurality of storage systems through the network.

16. The non-transitory computer readable medium of claim 15, further comprising instructions for:
receiving, from a user, the metadata for each storage system; and
transmitting the metadata to each storage system for storage to the local storage of each storage system.

17. A system, comprising at least one processor and memory, for providing a perspective of a set of storage systems, the system comprising:
a plurality of storage systems for storing client data, each storage system comprising associated metadata and at least one attribute describing the storage system, the metadata comprising at least one type of metadata and one or more values for the at least one type of metadata and the at least one attribute comprising at least one type of attribute and one or more values for the at least one type of attribute;
a manager engine configured for:
determining a set of one or more search rules comprising at least one metadata search rule and at least one attribute search rule, each metadata search rule specifying a type of metadata and one or more values for the type of metadata and each attribute search rule specifying a type of attribute and one or more values for the type of attribute;
retrieving the metadata and the at least one attribute for each storage system;
applying the set of search rules to the retrieved metadata and the at least one attribute to determine a set of one or more matching storage systems by applying the at least one metadata search rule to the retrieved metadata and the at least one attribute search rule to the at least one attribute; and
producing a perspective of the set of matching storage systems, the perspective comprising a hierarchical structure comprising a plurality of nodes arranged in a plurality of hierarchical levels, each node representing a search rule or a matching storage system.

18. The system of claim 17, wherein:
the at least one type of metadata for a storage system comprises metadata relating to a geographical location of the storage system, users of the storage system, or a storage use of the storage system; and
the at least one type of attribute for a storage system comprises configuration specifications of the storage system.

19. A non-transitory computer readable medium having instructions stored thereon when executed by a processor, provide a perspective of a set of storage systems, the non-transitory computer readable medium comprising instructions for:
storing client data to a plurality of storage systems, each storage system comprising associated metadata and at least one attribute describing the storage system, the metadata comprising at least one type of metadata and one or more values for the at least one type of metadata and the at least one attribute comprising at least one type of attribute and one or more values for the at least one type of attribute;
determining a set of one or more search rules comprising at least one metadata search rule and at least one attribute search rule, each metadata search rule specifying a type of metadata and one or more values for the type of metadata and each attribute search rule specifying a type of attribute and one or more values for the type of attribute;
retrieving the metadata and the at least one attribute for each storage system;
applying the set of search rules to the retrieved metadata and the at least one attribute to determine a set of one or more matching storage systems by applying the at least one metadata search rule to the retrieved metadata and the at least one attribute search rule to the at least one attribute; and
producing a perspective of the set of matching storage systems, the perspective comprising a hierarchical structure comprising a plurality of nodes arranged in a plurality of hierarchical levels, each node representing a search rule or a matching storage system.

20. The non-transitory computer readable medium of claim 19, wherein:
the at least one type of metadata for a storage system comprises metadata relating to a geographical location of the storage system, users of the storage system, or a storage use of the storage system; and
the at least one type of attribute for a storage system comprises configuration specifications of the storage system.

* * * * *